(12) United States Patent
Schoppmeier

(10) Patent No.: US 9,577,795 B2
(45) Date of Patent: Feb. 21, 2017

(54) IMPULSE NOISE DIAGNOSIS DURING RETRANSMISSION

(75) Inventor: Dietmar Schoppmeier, Unterhaching (DE)

(73) Assignee: Lantiq Beteiligungs-GmbH & Co. KG, Neubiberg (DE)

( * ) Notice: Subject to any disclaimer, the term of this patent is extended or adjusted under 35 U.S.C. 154(b) by 0 days.

(21) Appl. No.: 13/539,439

(22) Filed: Jun. 30, 2012

(65) Prior Publication Data

US 2013/0003813 A1    Jan. 3, 2013

(30) Foreign Application Priority Data

Jun. 30, 2011    (EP) .................................... 11005337

(51) Int. Cl.
*H04B 17/00* (2015.01)
*H04L 1/18* (2006.01)
*H04L 1/00* (2006.01)
*H04L 1/20* (2006.01)

(52) U.S. Cl.
CPC ............. *H04L 1/1867* (2013.01); *H04L 1/004* (2013.01); *H04L 1/20* (2013.01)

(58) Field of Classification Search
CPC .... H04L 1/1809; H04L 1/1812; H04L 1/1887; H04L 1/1819; H04L 1/188; H04L 1/1671; H04L 1/1854; H04L 1/1867; H04L 1/20; H04L 1/004; G06F 11/2007; G06F 11/2005; G06F 11/1423; G06F 11/2035
USPC .............. 714/749, 18, 748, E11.01; 375/227
See application file for complete search history.

(56) References Cited

U.S. PATENT DOCUMENTS

| | | | |
|---|---|---|---|
| 7,085,869 B1 | 8/2006 | Acharya et al. | |
| 2003/0039218 A1 | 2/2003 | Kwak | |
| 2006/0078044 A1 | 4/2006 | Norrell et al. | |
| 2008/0279562 A1* | 11/2008 | Naoe et al. | 398/140 |
| 2009/0138775 A1* | 5/2009 | Christiaens et al. | 714/748 |
| 2011/0072327 A1* | 3/2011 | Schoppmeier et al. | 714/749 |

FOREIGN PATENT DOCUMENTS

| | | |
|---|---|---|
| EP | 1848138 A2 | 10/2007 |
| EP | 2173052 A2 | 4/2010 |
| WO | 2009120825 A1 | 10/2009 |

OTHER PUBLICATIONS

EPO Search Report, Appl. No. 11005337.8, Oct. 31, 2011.

* cited by examiner

*Primary Examiner* — Albert Decady
*Assistant Examiner* — Kyle Vallecillo
(74) *Attorney, Agent, or Firm* — Eschweiler & Potashnik, LLC

(57) ABSTRACT

Disclosed and recited herein are devices, systems, methods, and programs by which data is transmitted and, when receipt of the transmitted data has not been acknowledged, an impulse noise occurrence may be diagnosed at the transmitter based on flag streams associated with data transfer units corresponding to the transmitted data. Characteristics of the impulse noise occurrence may be diagnosed based on, at least, a number of consecutive error bits in at least one of the flag streams associated with the data transfer units corresponding to the transmitted data.

12 Claims, 3 Drawing Sheets

IMPULSE NOISE DIAGNOSIS DURING RETRANSMISSION

RELATED APPLICATIONS

This Application claims priority to European Patent Application 11005337.8, filed Jun. 30, 2011. The entire contents of the earlier filed European Patent Application are incorporated herein by reference.

BACKGROUND

Disclosed and recited herein are communication devices, communication systems incorporating such communication devices, and corresponding methods and programs, by which data transmission and retransmission may be facilitated.

Transmission of data between a transmitter and a receiver, for example wireline transmission, e.g., xDSL transmission, or wireless transmission, may be governed by a number of communication parameters that may, e.g., determine an amount of protection against various types of noise encountered. However, impulse noise may still degrade at least portions of the transmitted data.

Examples of such impulse noise may include single high impulse noise events (hereafter "SHINE") and repetitive electrical impulse noise (hereafter "REIN"). SHINE may occur as random, unpredictable noise events; while REIN may occur as noise from electrical means, and therefore may repeat at a constant period related to a local AC power frequency.

BRIEF DESCRIPTION OF THE DRAWINGS

The foregoing and other features of this disclosure will become more fully apparent from the following description and appended claims, taken in conjunction with the accompanying drawings. Understanding that these drawings depict plural embodiments in accordance with the disclosure and are, therefore, not to be considered limiting of its scope, the disclosure will be described with additional specificity and detail through use of the accompanying drawings, in which:

DETAILED DESCRIPTION

Figure 1:
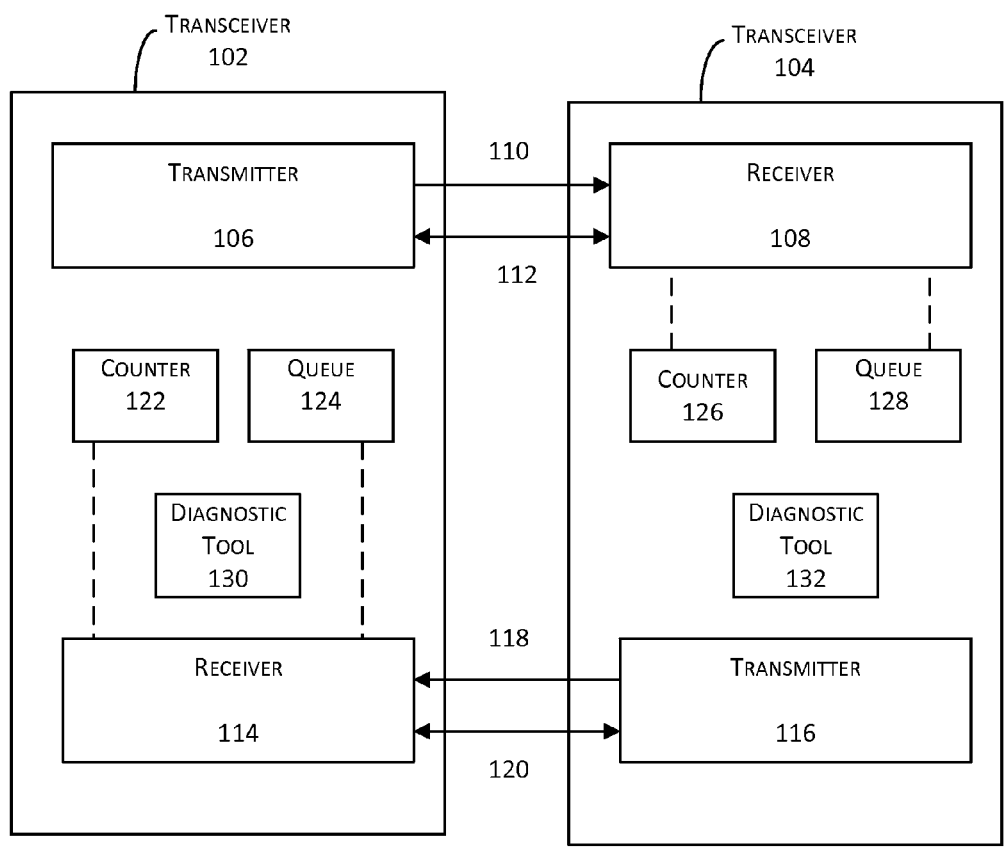
FIG. 1 shows a block diagram of an example communication system in which at least one embodiment of impulse noise diagnosis during retransmission may be implemented.

In a first aspect, an embodiment encompasses a method that includes transmitting data; determining that receipt of the transmitted data has not been acknowledged based a lack of acknowledgements for one or more data transfer units corresponding to the transmitted data; determining an impulse noise occurrence based on flag streams associated with the data transfer units corresponding to the transmitted data; diagnosing characteristics of the impulse noise occurrence based on, at least, a number of consecutive error bits in at least one of the flag streams associated with data transfer units corresponding to the transmitted data; and retransmitting the data. An effect of an embodiment in the first aspect may be the efficient and timely retransmission of data having been compromised by at least impulse noise.

In an embodiment according to an embodiment in the first aspect, the determining of an impulse noise occurrence includes determining that a number of error bits in one of the flag streams exceeds a predetermined threshold number that is based on a framing parameter predetermined by a receiver of the data.

In an embodiment according to an embodiment in the first aspect, the framing parameter is predetermined by the receiver based on a calculation that a transmitter of the data is to retransmit an unacknowledged one of the data transfer units after the transmitting of more data transfer units equal in number to the framing parameter.

In an embodiment according to an embodiment in the first aspect, the diagnosing includes characterizing the impulse noise occurrence as either of a single high impulse noise event (SHINE) or a repetitive electrical impulse noise (REIN).

In a second aspect, an embodiment encompasses a system, including a receiver to predetermine a framing parameter Qtx based on a calculation that a first data transfer unit is to be retransmitted thereto if an acknowledgement is not sent before Qtx further data transfer units are transmitted; and a transmitter to:

transmit the first data unit, determine that receipt of the first data unit has not been acknowledged, determine an impulse noise occurrence is responsible for the transmittal of the first data unit to not be acknowledged, retransmit the first data unit after the Qtx further data transfer units are transmitted, and diagnose characteristics of an impulse noise occurrence. An effect of an embodiment in the second aspect may be the efficient and timely retransmission of data having been compromised by at least impulse noise.

In an embodiment according to an embodiment in the second aspect, the transmitter is to determine the impulse noise occurrence based on error bits in flag streams associated with data transfer units transmitted therefrom.

In an embodiment according to an embodiment in the second aspect, the flag streams are stored in a table associated with the transmitter.

In an embodiment according to an embodiment in the second aspect, the transmitter is to diagnose the characteristics of the impulse noise occurrence as either of a single high impulse noise event (SHINE) or a repetitive electrical impulse noise (REIN).

In a second aspect, an embodiment encompasses a computer program included on a computer medium that stores the program, the program executable by a processor to determine an impulse noise occurrence in a transmission of data based on flag streams associated with the data transfer units corresponding to the transmitted data; diagnose characteristics of the impulse noise occurrence based on, at least, a number of consecutive error bits in at least one of the flag streams associated with data transfer units corresponding to the transmitted data; and retransmit the data. An effect of an embodiment in the third aspect may be the efficient and timely retransmission of data having been compromised by at least impulse noise.

In an embodiment according to an embodiment in the third aspect, the one or more instructions that cause the one or more processors to determine the impulse noise occurrence cause the one or more processors to determine that a number of error bits in one of the flag streams exceeds a predetermined threshold number.

In an embodiment according to an embodiment in the third aspect, the predetermined threshold number is based on a framing parameter predetermined by a receiver of the data.

In an embodiment according to an embodiment in the third aspect, the framing parameter is predetermined by the receiver based on a calculation that a transmitter of the data is to retransmit an unacknowledged one of the data transfer units after the transmitting of more data transfer units equal in number to the framing parameter.

In an embodiment according to an embodiment in the third aspect, the one or more instructions that cause the one or more processors to diagnose occurrence cause the one or more processors to diagnose the impulse noise occurrence to be either of a single high impulse noise event (SHINE) or a repetitive electrical impulse noise (REIN).

Finally, in at least one embodiment, data may be transmitted and, when receipt of the transmitted data has not been acknowledged, an impulse noise occurrence may be diagnosed at a transmitter of the data based on flag streams associated with data transfer units corresponding to the transmitted data. Characteristics of the impulse noise occurrence may be diagnosed based on, at least, a number of consecutive error bits in at least one of the flag streams associated with the data transfer units corresponding to the transmitted data.

The foregoing summary is illustrative only and is not intended to be in any way limiting. In addition to the illustrative aspects, embodiments, and features described above, further aspects, embodiments, and features will become apparent by reference to the drawings and the following detailed description.

In the following detailed description, reference is made to the accompanying drawings, which form a part of the description. Unless otherwise noted, the description of successive drawings may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Further, any connection that is described and/or recited herein as being wire-based may also be implemented as a wireless communication connection unless noted to the contrary.

In the embodiments disclosed and/or recited herein, communication devices, communications systems incorporating such communication devices, and corresponding methods and programs are described involving, at least, retransmission. Wire based communication systems, e.g., xDSL communication systems, disclosed and/or recited herein may be implemented as specified in, e.g., ITU-T G.998.4 and ITU-TG.992.3. The terminology used with respect to the description of such embodiments correspond to standard terminology used for these systems and is to be construed accordingly unless a definition of a specific term is given herein, in which case the definition given applies. However, such common terminology may also encompass corresponding elements in other types of communication other than DSL communication, such as wireless communications.

For the embodiments disclosed and/or recited herein, the following terminology is provided.

A parameter, or communication parameter, may be regarded as a value that determines how data is sent from a transmitter to a receiver. An example of which may include a parameter that determines a data rate, a protection against noise, a modulation, or a format of data transmitted.

A framing parameter may be regarded as a parameter that determines the format of a frame or unit of data.

Forward error correction (FEC) may be regarded as subjecting data to be transmitted to a specific coding involving redundancy, e.g., Reed-Solomon encoding, so that data may be reconstructed in the event of partial data loss. That is, for forward error correction, data is submitted to specific coding thus generating code words which are then further processed for transmission.

A data transfer unit (DTU) may be regarded as a unit of data that may be subjected, as a whole, to coding for forward error correction. A DTU may include at least an identifier, e.g., a sequence identifier (SID) and, optionally, a time stamp (TS). A DTU is usable for retransmission. Further, a DTU in the context of xDSL transmission may contain an integer number of ATM (Asynchronous Transfer Mode) cells or an integer number of PTM (Packet Transfer Mode) code words. Furthermore, a data transfer unit may comprise an overhead for a checksum (Cyclic Redundancy Check) and so-called padding bytes.

Retransmission may be regarded as a technique by which the reliability of data transmission is increased. Retransmission takes into account the acknowledgement of transmitted DTUs by a corresponding receiver using, for example, the identifier of a DTU; however, if the transmitter of the DTU does not receive such an acknowledgement or receives a negative acknowledgement, the DTU may be retransmitted, i.e., transmitted again, possibly until a predetermined maximum time has expired.

A data transfer unit framer (DTU framer) may be regarded as an entity that generates data transfer units based on data to be transmitted.

Framing parameters for a DTU framer may, for example, include a number of Reed-Solomon codewords per DTU, a number of padding bytes per DTU, or a framing type that may define the DTU framing structure. Example communication parameters for retransmission of DTU may include, for example, a delay between two consecutive transmissions of the same DTU. A more particular example may include a framing parameter referred to as, e.g., $Qt_x$, which may be pre-selected by a receiver during "training" between a transmitter and the receiver. Accordingly, $Qt_x$ may be predetermined based on a calculation that the transmitter may retransmit a DTU after Qtx DTUs if the transmitted DUT has not been acknowledged positively during this time frame. Further example communication parameters for transmission may include, for example, defining a roundtrip time or half roundtrip time. Roundtrip may be regarded as time needed to transmit a DTU from a transmitter to a receiver and receiving the corresponding acknowledgement again at the transmitter.

FIG. 1 shows a block diagram of an example communication system 100 in which at least one embodiment of impulse noise diagnosis during retransmission may be implemented. Communication system 100 includes, at least, a first transceiver 102 and a second transceiver 104. Further, the components of system 100 disclosed and/or recited herein, which are not necessarily inclusive of all such components, may be implemented as software, firmware, hardware, or any combination thereof.

First transceiver 102 may include, at least, a first transmitter 106 and a first receiver 114.

Second transceiver 104 may include, at least, a second transmitter 116 and a second receiver 108.

First transmitter 106 may transmit and retransmit data via a communication channel 110 to second receiver 108. Retransmission request channel (RRC) 112 may carry acknowledgements for DTUs received at receiver 108.

Second transmitter 116 may transmit and retransmit data via a communication channel 118 to first receiver 114. Retransmission request channel (RRC) 120 may carry acknowledgements for DTUs received at receiver 114.

Counters 122 and 126 may count acknowledged DTUs received at receiver 114 and receiver 108, respectively. Further, counters 122 and 126 may run synchronously for the pairing of transmitter 106 and receiver 108 and for the pairing of transmitter 116 and receiver 114.

Retransmission queue 124 may receive a copy of DTUs transmitted from transmitter 106 to receiver 108 upon transmittal. A retransmission timer based on the framing parameters for DTU framer may then be started upon receipt at retransmission queue 124. Retransmission queue 124 may be kept sorted by time frame increments for segments of the transmitted DTUs. If an acknowledgement of successful transmission is received before, e.g., another $Qt_x$ DTUs are transmitted, the corresponding segment of DTUs may be removed from retransmission queue 124. If an acknowledgement of successful transmission is not received before another $Qt_x$ DTUs are transmitted, the corresponding segment of DTUs may recalled from queue 124 to be retransmitted from transmitter 106.

Retransmission queue 128 is similarly utilized with respect to receiver 108.

Diagnostic tools 130 and 132 may be utilized in transceivers 102 and 104, respectively, to derive impulse width noise after the existence of impulse noise has been detected in either of communication channels 110 and 118, respectively.

First transmission channel 110 and second transmission channel 118 may be implemented in the same physical medium, for example a wireline using xDSL transmission, in which different frequency ranges may be assigned to first transmission channel 110 and second transmission channel 118.

The data transmission from first transmitter 106 to second receiver 108 and/or the data transmission from second transmitter 116 to first receiver 114 may involve FEC and retransmission. In particular, the data may be transmitted using DTUs, and DTUs that are not acknowledged as being received may be retransmitted.

Figure 2:
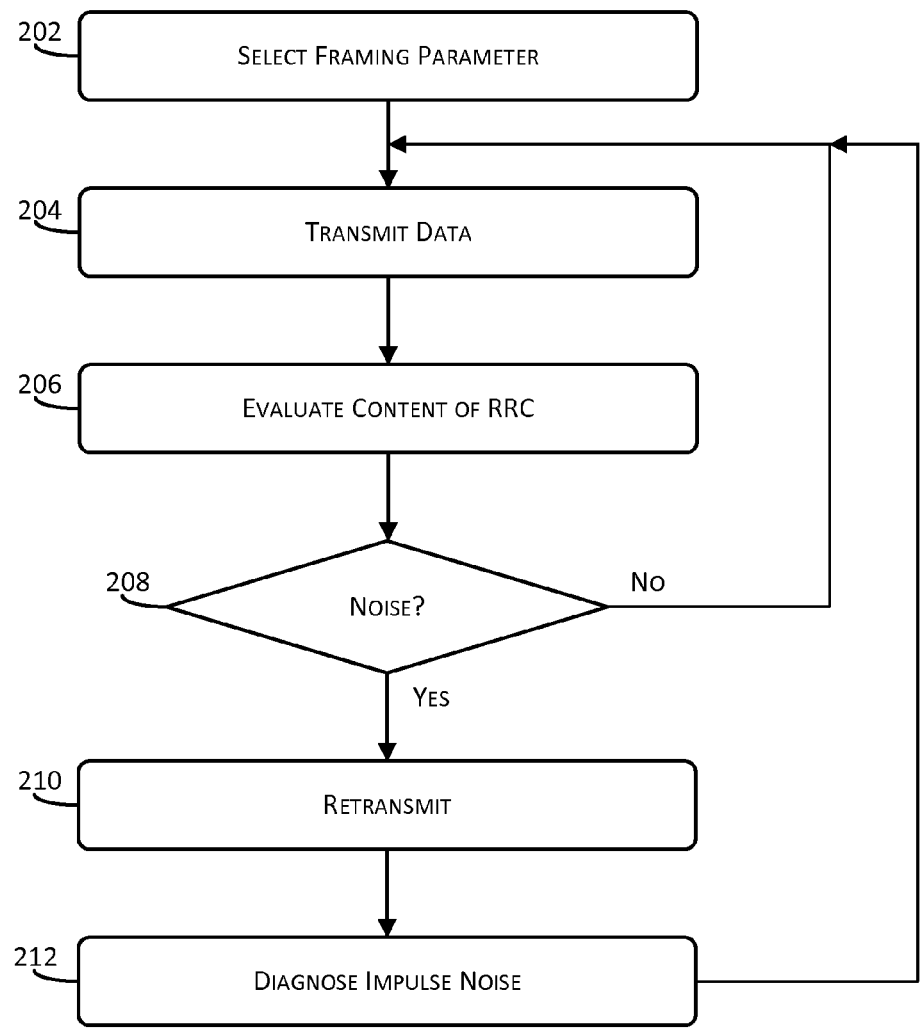
FIG. 2 shows a processing flow for an example implementation of impulse noise diagnosis.

FIG. 2 shows a processing flow 200 for an example implementation of impulse noise diagnosis. Processing flow 200 may include one or more operations, actions, or functions, as illustrated by one or more of blocks 202, 204, 206, 210, and 212. Although illustrated as discrete blocks, various blocks may be divided into additional blocks, combined into fewer blocks, or eliminated altogether, depending on the desired implementation. Moreover, the blocks in the FIG. 2 may be operations that can be implemented in hardware, software, or a combination thereof. In the context of software, the blocks represent computer-executable instructions that, when executed by one or more processors, cause one or more processors to perform the disclosed or recited operations. Generally, computer-executable instructions include routines, programs, objects, components, data structures, and the like that cause the particular functions to be performed or particular abstract data types to be implemented. Processing flow 200 may begin at block 202.

Block 202 may include "training" at the respective ones of transmitter 108 and 114, during which, at least, a basic framing parameter for DTUs may be determined. In accordance with at least one embodiment of impulse noise diagnosis, framing parameter $Qt_x$ may be predetermined based on a calculation that the transmitter may retransmit a DTU after a subsequent Qtx DTUs have been transmitted, if the transmitted DTU has not been acknowledged positively during this time frame. In accordance with an alternative embodiment, the framing parameter may be time-based. However, in general, a basic framing parameter for DTUs Basic framing parameters may be generated by an algorithm that takes into account the communicated service constraints (e.g., minimum impulse noise protection, maximum permitted delay) and entity characteristics (e.g., half roundtrip of receiver, half roundtrip of transmitter, receiver noise and possible bit loading, buffer limitations). The basic framing parameters are usually selected during the training phase but can be also changed during showtime. Processing flow 200 may proceed to block 204.

Block 204 may include at least one of transmitter 106 transmitting data to receiver 108 and transmitter 116 transmitting data to receiver 114. Upon such transmittal of data, retransmission queue 124 may receive a copy of the data transmitted from transmitter 106 to receiver 108, and retransmission queue 128 may receive a copy of the data transmitted from transmitter 116 to receiver 114. Processing flow 200 may proceed to block 206.

Block 206 may include a transmitting one of transmitter 106 and transmitter 116 evaluating the content on RRC 112 and RRC 120, respectively. RRC 112 and RRC 120 are channels with a constant bit rate on which all transmitted DTUs are acknowledged. Such acknowledgement of transmitted DTUs may be based on the contents of counters 122 and 126, respectively, which runs synchronously for transmitter 106 and receiver 108 and for transmitter 116 and receiver 114.

More particularly, at block 206, an evaluation may be performed at a transmitting one of transmitter 106 and transmitter 116 of the contents of RRC 112 and RRC 120, respectively, and a table may be maintained with the count from counters 122 and 126, respectively, and a TBR ("to be retransmitted") flag for each DTU stored in the respective retransmission queues 124 and 128. Processing flow 200 may proceed to decision block 208.

Decision block 208 may include a determination of an impulse noise occurrence based on a TBR=1 flag in a TBR flag stream in the table within after Qtx DTUs after transmission of a respective DTU. Processing flow 200 may proceed to block 210.

Block 210 may include a respective one of transmitter 106 and 108 retransmitting a DTU for which an impulse noise occurrence has been detected at block 208. Processing flow 200 may proceed to block 212.

Block 212 may include diagnosing the determined impulse noise occurrence. Advantages for conducting such diagnosis may include gleaning pre-knowledge about impulse noise scenarios for future transmissions, determining new configuration parameters for minimum impulse noise protection, and determining user-specific impulse noise scenarios for correction thereof. Processing flow 200 may return to block 204 for continued transmission.

With regard to the diagnosis of determined impulse noise occurrences, an examination may be made of the tables at transmitter 106 and transmitter 108, respectively. More particularly, attention may be directed to a DTU transmission stream therein, which has a constant bit rate (CBR), meaning there are no holes between DTUs, thus impulse noises may be derived from a TBR flag stream.

A TBR flag stream may be regarded as a stream of TBR flags of consecutively transmitted DTUs. A TBR flag in the stream may represent the acknowledgement status of the associated DTU, for the respective one of transmitters 106 and 116, at the point that a subsequent Qtx DTUs have been transmitted. That is, the TBR flag stream may be delayed by Qtx DTUs in comparison with the DTU stream.

An error burst, indicative of an impulse noise occurrence, may be determined by considering the number of consecutive TBR=1 flags; wherein, in addition to actual TBR=1 flags, the occurrence of a number of consecutive TBR=0 flags that is equal to or less than Qtx−1 DTUs within this sequence may also be treated as a TBR=1 flag.

A diagnosis of the error burst may result in a characterization of the impulse noise occurrence, for the advantageous reasons described above, as a single high impulse noise event (SHINE) or a repetitive electrical impulse noise (REIN). As set forth above, SHINE may occur as random, unpredictable noise events, and REIN may occur as noise from electrical means, and therefore may repeat at a constant period related to a local AC power frequency Impulse noise width associated with the detected impulse noise occurrence may be determined in accordance with the following parameters and computations:

DTU size in DMT data symbols is $T_{DTU}=Q*S_1$, whereby Q is the number of FEC codewords in one DTU (basic framing parameter);

$S_1$ is the number of symbols per FEC codeword, whereby $S_1=8*N_{FEC1}/L_1$;

$N_{FEC1}$ is number of bytes per FEC codeword; and $L_1$ as number of bits per DMT data symbol;

The time of a DMT symbol $T_{DMT}$ at the U-interface (on the line) may be derived by at least one of:

$T_{DMT}=0.25*68/69$ ms in ADSL2/2+operation, $T_{DMT}=0.25$ ms in VDSL2 operation, and $T_{DMT}=0.125$ ms in VDSL2 operation.

An impulse noise that corrupts INW DMT data symbols may lead maximal to DEBmax corrupt DTUs without taking into account a symbol-DTU alignment, DEBmax=ceil(INW/(Q*$S_1$))+1.

If the DTU fits a certain number of times in a DMT data symbol, the additional DTU in above DEBmax equation may not occur so that DEBmax=ceil(INW/(Q*$S_1$))+ceil(modulo(1/(Q*$S_1$),1)).

An impulse noise that corrupts INW DMT data symbols may lead to minimal DEBmin corrupt DTUs by DEBmin=ceil(INW/(Q*$S_1$)).

Lastly, a reverse projection of INW from a DEB value may be derived by INW_BP=max(1,ceil((DEB−ceil(modulo(1/(Q*$S_1$),1)))*(Q*$S_1$))).

In accordance with above-described embodiments of impulse noise diagnosis, impulse noise occurrences in the context of DTU transmission may be detected and diagnosed.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent processes and even apparatuses within the scope of the disclosure, in addition to those described herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the terminology used herein is for the purpose of describing particular embodiments only, and is not intended to be limiting.

Figure 3:
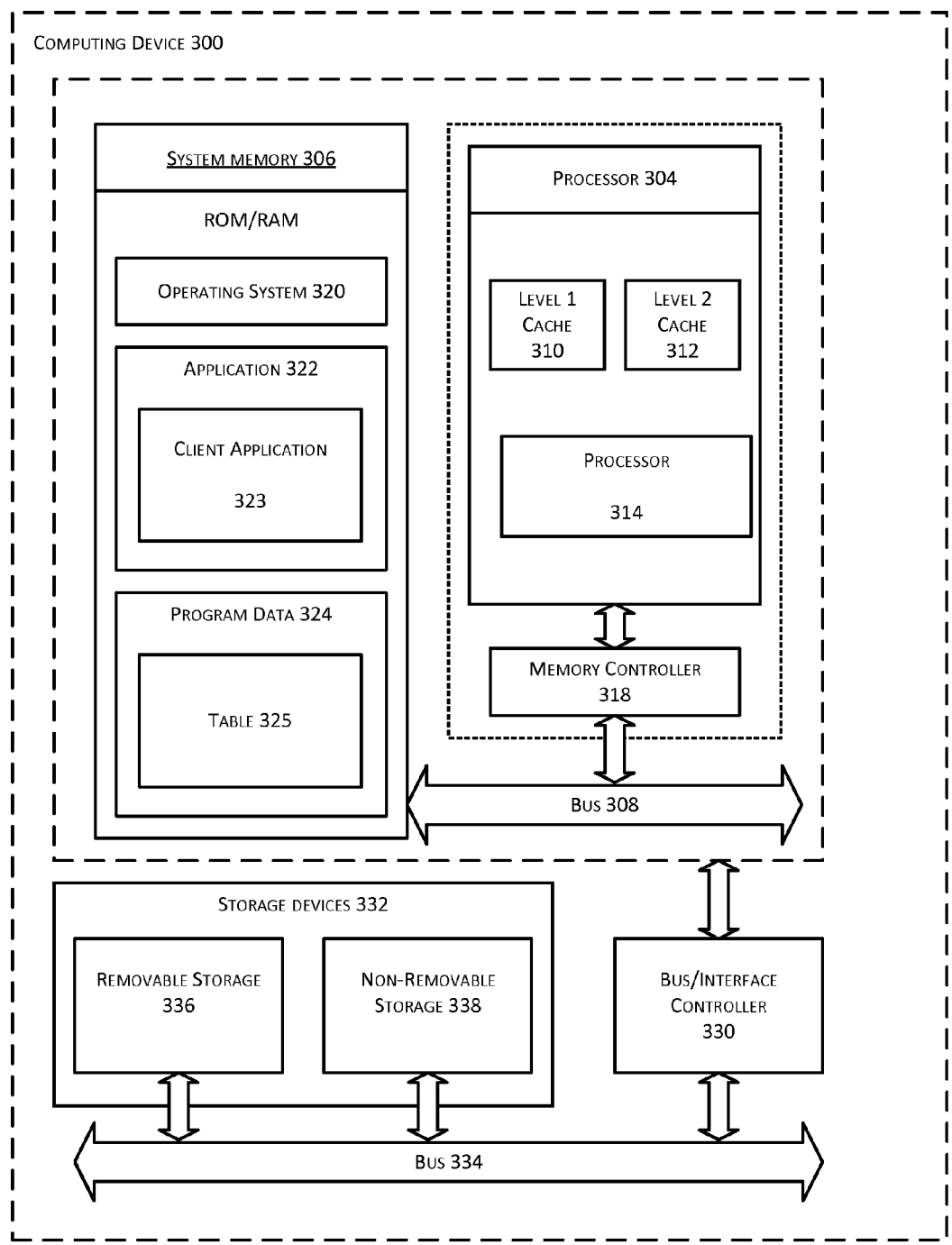
FIG. 3 shows a flow diagram illustrating a method by which at least one embodiment of impulse noise diagnosis during retransmission may be implemented.

FIG. 3 shows a flow diagram illustrating a method by which at least one embodiment of impulse noise diagnosis during retransmission may be implemented.

More particularly, FIG. 3 shows an illustrative computing embodiment, in which any of the operations, processes, etc. described herein may be implemented as computer-readable instructions stored on a computer-readable medium. The computer-readable instructions may, for example, be executed by a processor of a mobile unit, a network element, and/or any other computing device.

In an example configuration 302, computing device 300 may typically include one or more processors 304 and a system memory 306. A memory bus 308 may be used for communicating between processor 304 and system memory 306.

Depending on the desired configuration, processor 304 may be of any type including but not limited to a microprocessor, a microcontroller, a digital signal processor (DSP), or any combination thereof. Processor 304 may include one more levels of caching, such as level one cache 310 and level two cache 312, and processor core 314.

An example processor core 314 may include an arithmetic logic unit (ALU), a floating point unit (FPU), a digital signal processing core (DSP Core), or any combination thereof. Processor 114 may be implemented as processor core 314. Further, example memory controller 318 may also be used with processor 304, or in some implementations memory controller 318 may be an internal part of processor 304.

Depending on the desired configuration, system memory 306 may be of any type including but not limited to volatile memory (such as RAM), non-volatile memory (such as ROM, flash memory, etc.) or any combination thereof. Storage 112 may be implemented as memory 306 in at least one embodiment of system 100. System memory 306 may include an operating system 320, one or more applications 322, and program data 324.

Application 322 may include Client Application 323 that is arranged to perform the functions as described herein including those described previously with respect to FIGS. 1 and 2. Program data 324 may include Table 325, which may alternatively be referred to as "figure table 325" or "distribution table 325."

Computing device 300 may have additional features or functionality, and additional interfaces to facilitate communications between basic configuration 302 and any required devices and interfaces. For example, bus/interface controller 330 may be used to facilitate communications between basic configuration 302 and one or more data storage devices 332 via storage interface bus 334. Data storage devices 332 may be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 306, removable storage devices 336, and non-removable storage devices 338 are examples of computer storage media. Computer storage media may include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 300. Any such computer storage media may be part of computing device 300.

We claim:

1. A method, comprising:
   transmitting data in data transfer units;
   determining that receipt of the transmitted data has not been acknowledged based on a lack of acknowledgements for one or more of the data transfer units corresponding to the transmitted data;
   determining an impulse noise occurrence based on a flag stream associated with the data transfer units, the flag stream comprising, for each of the data transfer units, a flag representing an acknowledgement status of the corresponding data transfer unit;
   diagnosing characteristics of the impulse noise occurrence based on, at least, a number of consecutive error bits in the flag stream, the error bits being constituted by those flags of the flag stream which indicate that the corresponding data transfer unit is to be retransmitted; and
   retransmitting the data.

2. The method according to claim 1, wherein the determining of an impulse noise occurrence includes determining that a number of error bits in the flag stream exceeds a predetermined threshold number that is based on a framing parameter predetermined by a receiver of the data.

3. The method according to claim 2, wherein the framing parameter is predetermined by the receiver based on a calculation that a transmitter of the data is to retransmit an unacknowledged one of the data transfer units after the transmitting of more data transfer units equal in number to the framing parameter.

4. The method according to claim 1, wherein the diagnosing includes characterizing the impulse noise occurrence as either of a single high impulse noise event (SHINE) or a repetitive electrical impulse noise (REIN).

5. A system, comprising:
   a receiver to predetermine a framing parameter $Qt_x$ based on a calculation that a first data transfer unit is to be retransmitted thereto if an acknowledgement is not sent before $Qt_x$ further data transfer units are transmitted; and
   a transmitter to:
      transmit the first data unit,
      based on a flag stream comprising, for each of the data transfer units, a flag representing an acknowledgement status of the corresponding data transfer unit, determine that receipt of the first data unit has not been acknowledged,
      determine an impulse noise occurrence is responsible for the transmittal of the first data unit to not be acknowledged,
      retransmit the first data unit after the $Qt_x$ further data transfer units are transmitted, and
      diagnose characteristics of an impulse noise occurrence based on, at least, a number of consecutive error bits in the flag stream, the error bits being constituted by those flags of the flag stream which indicate that the corresponding data transfer unit is to be retransmitted.

6. The system of claim 5, wherein the flag stream is stored in a table associated with the transmitter.

7. The system according to claim 5, wherein the transmitter is to diagnose the characteristics of the impulse noise occurrence as either of a single high impulse noise event (SHINE) or a repetitive electrical impulse nose (REIN).

8. A non-transitory computer-readable medium that stores instructions thereon that, when executed, cause one or more processors to:
   transmit data in data transfer units,
   determine an impulse noise occurrence in a transmission of data based on a flag stream associated with the data transfer units, the flag stream comprising, for each of the data transfer units, a flag representing an acknowledgement status of the corresponding data transfer unit;
   diagnose characteristics of the impulse noise occurrence based on, at least, a number of consecutive error bits in the flag stream, the error bits being constituted by those flags of the flag stream which indicate that the corresponding data transfer unit is to be retransmitted; and
   retransmit the data.

9. The computer-readable medium according to claim 8, wherein the one or more instructions that cause the one or more processors to determine the impulse noise occurrence cause the one or more processors to determine that a number of error bits in the flag stream exceeds a predetermined threshold number.

10. The computer-readable medium according to claim 9, wherein the predetermined threshold number is based on a framing parameter predetermined by a receiver of the data.

11. The computer-readable medium according to claim 10, wherein the framing parameter is predetermined by the receiver based on a calculation that a transmitter of the data is to retransmit an unacknowledged one of the data transfer units after the transmitting of more data transfer units equal in number to the framing parameter.

12. The computer-readable medium according to claim 8, wherein the instructions that cause the one or more processors to diagnose occurrence cause the one or more processors to diagnose the impulse noise occurrence to be either of a single high impulse noise event (SHINE) or a repetitive electrical impulse noise (REIN).

* * * * *